US012614302B2

(12) United States Patent
Molin

(10) Patent No.: US 12,614,302 B2
(45) Date of Patent: Apr. 28, 2026

(54) METHOD OF ESTIMATING A THREE-DIMENSIONAL POSITION OF AN OBJECT

(71) Applicant: TOBII AB, Danderyd (SE)

(72) Inventor: David Molin, Danderyd (SE)

(73) Assignee: Tobii AB, Danderyd (SE)

( * ) Notice: Subject to any disclaimer, the term of this patent is extended or adjusted under 35 U.S.C. 154(b) by 405 days.

(21) Appl. No.: 18/198,313

(22) Filed: May 17, 2023

(65) Prior Publication Data

US 2023/0394699 A1 Dec. 7, 2023

(30) Foreign Application Priority Data

Jun. 3, 2022 (SE) .................................... 2250674-5

(51) Int. Cl.
*G06K 9/00* (2022.01)
*G06T 7/70* (2017.01)
*G06T 7/80* (2017.01)

(52) U.S. Cl.
CPC .................. *G06T 7/70* (2017.01); *G06T 7/80* (2017.01); *G06T 2207/20076* (2013.01)

(58) Field of Classification Search
CPC ... G06T 7/70; G06T 7/80; G06T 2207/20076; G06T 2207/20021; G06T 2207/20084; G06T 2207/30201; G06T 7/77; G06T 7/55; G06T 2207/20081; G06T 2207/20132; G06N 20/00
See application file for complete search history.

(56) References Cited

U.S. PATENT DOCUMENTS

| | | | |
|---|---|---|---|
| 10,339,411 B1 | 7/2019 | Hua et al. | |
| 2019/0340775 A1 | 11/2019 | Lee et al. | |
| 2020/0334858 A1* | 10/2020 | Hoffmann | A61B 3/113 |
| 2020/0349362 A1* | 11/2020 | Maloney | G01S 5/16 |
| 2020/0380316 A1 | 12/2020 | Lee et al. | |
| 2021/0012105 A1* | 1/2021 | Masko | G06T 7/277 |
| 2021/0158023 A1* | 5/2021 | Fu | G06T 7/50 |
| 2021/0209785 A1 | 7/2021 | Unnikrishnan et al. | |

(Continued)

FOREIGN PATENT DOCUMENTS

WO     2021110497     6/2021

OTHER PUBLICATIONS

Moon Gyeongsik et al: "Camera Distance-Aware Top-Down Approach for 3D Multi-Person Pose Estimation From a Single RGB Image", 2019 IEEE/CVF International Conference on Computer Vision (ICCV), IEEE, Oct. 27, 2019 (Oct. 27, 2019), pp. 10132-10141, XP033724101, DOI: 10.1109/ICCV.2019.01023.

(Continued)

*Primary Examiner* — Gregory A Morse
*Assistant Examiner* — Owais Iqbal Memon
(74) *Attorney, Agent, or Firm* — Christopher Ignatius Moylan

(57) ABSTRACT
The disclosure relates to a method of estimating a three-dimensional position of at least one target object performed by a computer, the method comprising obtaining a first image, detecting at least one target object, generating a set of images depicting subsets of a captured scene, and estimating a three-dimensional position of at least one target object using a probability distribution (P) indicative of a likelihood that the at least one target object is in a particular position (x, y, z) in the scene.

17 Claims, 10 Drawing Sheets

(56) References Cited

U.S. PATENT DOCUMENTS

2021/0209797 A1* 7/2021 Lee ........................ G06T 17/00
2022/0236797 A1* 7/2022 Drozdov ............... G06V 10/82

OTHER PUBLICATIONS

Naiden Andretti et al: "Shift R-CNN: Deep 1-15 Monocular 3D Object Detection With Closed-Form Geometric Constraints", 2019 IEEE International Conference on Image Processing (ICIP), IEEE, Sep. 22, 2019 (Sep. 22, 2019), pp. 61-65, XP033647308, DOI: 10.1109/ICIP.2019.8803397.

Xu Bin et al: "Multi-level Fusion Based 3D Object Detection from Monocular Images", 2018 IEEE/CVF Conference on Computer Vision and Pattern Recognition, IEEE, Jun. 18, 2018 (Jun. 18, 2018), pp. 2345-2353, XP033476200, DOI: 10.1109/CVPR.2018. 00249.

European Search Report in EP23175911, Completed on Oct. 18, 2023.

Swedish Search Report regarding SE App. No. 2250674-5, Dated Dec. 12, 2022.

Chinese Search Report of Jul. 17, 2025 for Chinese Patent Application 202310615756,6.

* cited by examiner

300

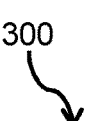

310: obtaining a first image depicting a scene, wherein the scene comprises at least one target object.

320: detecting at least one target object, wherein the at least one target object is detected using an object detector and the first image

321: identifying at least one target object

323: generating coordinates indicating a position of the at least one detected target object

330: generating a set of images depicting subsets of the captured scene

340: estimating parameters of a probability distribution indicative of a likelihood that the at least one target object is in a particular position in the scene by providing the generated set of images to a trained model

350: estimating a three-dimensional position of at least one target objects using the probability distribution

361: obtaining a second image depicting at least a part of the scene captured by a second physical camera, wherein the at least part of the scene comprises the at least one target object 362: detecting the at least one target object using the object detector and the second image, wherein detecting comprises identifying, by the object detector, the at least one target object and generating, by the object detector, second coordinates indicating a position of the at least one detected target object 363: generating a second set of images depicting subsets of the captured at least part of the scene, the subsets of the scene being depicted by at least one second virtual camera 364: estimating parameters of a second probability distribution indicative of a likelihood that the at least one target object is in a particular position in the second image by providing the generated set of images to the trained model 365: generating a combined probability distribution by combining the probability distribution and the second probability distribution 366: estimating the three-dimensional position of the at least one target object using the combined probability distribution

Fig. 4

METHOD OF ESTIMATING A THREE-DIMENSIONAL POSITION OF AN OBJECT

CROSS-REFERENCE TO RELATED APPLICATION

This application claims priority to Swedish Patent Application No. 2250674-5, filed Jun. 3, 2022, entitled "METHOD OF ESTIMATING A THREE-DIMENSIONAL POSITION OF AN OBJECT," and is hereby incorporated by reference in its entirety.

TECHNICAL FIELD

The present application relates to estimation of three-dimensional positions of an object. In particular, the present application relates to estimation of three-dimensional positions of an object for user gaze detection systems.

BACKGROUND

Interaction with computing devices is a fundamental action in today's world. Computing devices, such as personal computers, tablets, and smartphones, are found throughout daily life. The systems and methods for interacting with such devices define how they are used and what they are used for.

Advances in eye/gaze tracking technology have made it possible to interact with a computer/computing device using a person's gaze information. For example, the location on a display or real-world scene that the user is gazing at/viewing may be used as input to the computing device. This input can be used for interaction solely, or in combination with a contact-based interaction technique (e.g., using a user input device, such as a keyboard, a mouse, a touch screen, or another input/output interface). Such interactions generally require estimation of three-dimensional positions of a target object for applications such as gaze estimation, body pose estimation or facial landmark estimation.

Estimating positions of one or more target objects may be performed by estimation of parameters of a probability distribution. These parameters of the probability distribution often require constraints, for example to ensure that the total probability of events do not exceed 100%. Therefore, enforcing the constraints imposed by the parameters of the distribution is important.

A physical camera typically captures two-dimensional projections of a three-dimensional, 3D, space. Physical cameras possess the property that a point on the projected image space correspond to a ray in the real-world space/three-dimensional space. In this context, the term "ray" denotes a path electromagnetic radiation may take when performing ray tracing, typically from a camera to a target object, which is well-known in the art. To establish a relationship between how points in the projected image space relate to rays in the real-world space/three-dimensional space, for a given physical camera, is referred to as calibration. Calibration parameters can be separated into two components, camera intrinsic and camera extrinsic. The extrinsic of a camera describes the position and orientation of the camera in 3D space. The intrinsic of the camera describes other properties of the camera, such as a field of view and a focal length of the camera.

Conventional solutions to 3D position estimation suffer from reduced accuracy when estimating a distance to an object compared to estimating the direction/ray to a target object from images.

Document WO2014041188A1 shows the use of a probability distribution which indicates the probability that the subject gazes at a certain object in an image. A drawback with this solution is low accuracy when estimating a position of an object, in an image.

Thus, there is a need for an improved method for estimation of three-dimensional positions of a target object.

OBJECTS OF THE INVENTION

An objective of embodiments of the present invention is to provide a solution which mitigates or solves the drawbacks described above.

SUMMARY OF THE INVENTION

The above objective is achieved by the subject matter described herein. Further advantageous implementation forms of the invention are described herein.

According to a first aspect of the invention the object of the invention is achieved by a method of estimating a three-dimensional position of at least one target object performed by a computer, the method comprising obtaining a first image depicting a scene captured by a physical camera, wherein the scene comprises the at least one target object, detecting at least one target object, wherein the at least one target object is detected using an object detector and the first image, wherein detecting comprises identifying, by the object detector, the at least one target object and generating, by the object detector, coordinates indicating a position of the at least one detected target object, generating a set of images depicting subsets of the captured scene, the subsets of the scene being depicted by at least one virtual camera, estimating parameters of a probability distribution indicative of a likelihood that the at least one target object is in a particular position in the scene by providing the generated set of images to a trained model, and estimating a three-dimensional position of at least one target object using the probability distribution P.

At least one advantage of the first aspect of the invention is that the accuracy of the estimated three-dimensional position of at least one target object is improved.

In one embodiment of the first aspect, the method further comprises generating one or more target areas using predetermined camera calibration parameters for the physical camera, wherein each of one target area defines a respective subset of the scene being depicted by a respective virtual camera, wherein the respective subset comprises a respective detected target object.

In one embodiment of the first aspect, one or more target areas are configured with a symmetric geometric shape, such as a rectangle or a box.

In one embodiment of the first aspect, the predetermined camera calibration parameters for the at least one virtual camera comprises a selection of an image sensor size, a principal axis intersecting with the virtual camera/s and the at least one target object and a focal length, and the generated set of images are generated by applying the predetermined camera calibration parameters for the at least one virtual camera to each virtual camera to generate the set of images and selecting pixels from the first image falling within the target area.

In one embodiment of the first aspect, the method further comprises applying a transformation function v to the estimated parameters of the probability distribution P to transform the estimated parameters within predetermined constraints of the probability distribution P.

In one embodiment of the first aspect, the trained model is trained using training data comprising images captured by a physical camera, ground truth target areas and ground truth positions of the target object.

In one embodiment of the first aspect, the trained model is trained using a gradient-based optimizer and a loss function between the coordinates of target objects and the ground truth coordinates of target objects.

In one embodiment of the first aspect, the loss function comprises a negative log likelihood function.

In one embodiment of the first aspect, the loss function is defined as:

$$L(x, y, z, A, a, \mu) = \left\| A\left( \begin{bmatrix} x/z \\ y/z \end{bmatrix} - \begin{bmatrix} \mu_x \\ \mu_y \end{bmatrix} \right) \right\|_2 * \frac{z}{\mu_z} +$$
$$\log\left(\frac{z}{\mu_z}\right) + \exp\left(a * g\left(\log\left(\frac{z}{\mu_z}\right)\right)\right) - \log(N(A, a, \mu))$$

where (x, y, z) are coordinates of the target object, (A, a, μ) are the parameters of the probability distribution, N is a normalizing constant.

In one embodiment of the first aspect, the probability distribution P is defined as:

$$P(x, y, z) = N(A, a, \mu)\exp\left(-f\left(\left\| A\left(\begin{matrix} x/z \\ y/z \end{matrix} - \begin{matrix} \mu_x \\ \mu_y \end{matrix}\right) \right\| \frac{z}{\mu_z}\right)\right) \frac{\mu_z}{z} \exp\left(a * g\left(\log\left(\frac{z}{\mu_z}\right)\right)\right)$$

where P is the likelihood that the target object is located in a particular position (x, y, z) in the scene, A is a 2×2 covariance matrix defining the image plane of the physical camera, a is standard deviation of the estimated depth of the target object, μ is an average value of the estimated depth of the target object, ∥ ∥ is a norm and [ ] is a two-dimensional vector, and where the function g(z) is configured to be symmetric around 0, and where the expression $$\exp\left(a \cdot g\left(\log\left(\frac{z}{\mu_z}\right)\right)\right) + \log\left(\frac{z}{\mu_z}\right)$$

is convex relative to a z axis of a coordinate system of at least one virtual camera.

In one embodiment of the first aspect, the function f of the probability distribution P is selected from any of the functions:

$$f(x) = \frac{\exp(-x^2)}{2}$$

$$f(x) = \exp(-|x|)$$

$$f(x) = \exp(-h_1(x)).$$

In one embodiment of the first aspect, the function g of the probability distribution P is selected from any of the functions:

$$g(x) = |x|,$$

$$g(x) = x^2,$$

$$g(x) = h_1(x).$$

In one embodiment of the first aspect, the method further comprises transforming the estimated three-dimensional position of at least one target object to a position in a coordinate system of the first image.

In one embodiment of the first aspect, the method further comprises obtaining a second image depicting at least a part of the scene captured by a second physical camera, wherein the at least part of the scene comprises the at least one target object, detecting the at least one target object, wherein the at least one target object is detected using the object detector and the second image, wherein detecting comprises identifying, by the object detector, the at least one target object and generating, by the object detector, second coordinates indicating a position of the at least one detected target object, generating a second set of images depicting subsets of the captured at least part of the scene, the subsets of the scene being depicted by at least one second virtual camera, estimating parameters of a second probability distribution indicative of a likelihood that the at least one target object is in a particular position in the second image by providing the generated set of images to the trained model, generating a combined probability distribution by combining the probability distribution and the second probability distribution, estimating the three-dimensional position of the at least one target object using the combined probability distribution.

According to a second aspect of the invention the object of the invention is achieved by a system, the system comprising a computer comprising processing circuitry; and a memory, said memory containing instructions executable by said processing circuitry, whereby said computer is operative to perform the method according to the first aspect.

According to a third aspect of the invention the object of the invention is achieved by a computer program comprising computer-executable instructions for causing a computer, when the computer-executable instructions are executed on processing circuitry comprised in the computer, to perform the method according to the first aspect.

According to a fourth aspect of the invention the object of the invention is achieved by a computer program product comprising a computer-readable storage medium, the computer-readable storage medium having the computer program according to the third aspect comprised therein.

The scope of the invention is defined by the claims, which are incorporated into this section by reference. A more complete understanding of embodiments of the invention will be afforded to those skilled in the art, as well as a realization of additional advantages thereof, by consideration of the following detailed description of one or more embodiments. Reference will be made to the appended sheets of drawings that will first be described briefly.

BRIEF DESCRIPTION OF THE DRAWINGS

FIG. 3 shows a flowchart of a method according to one or more embodiments of the present disclosure.

FIG. 4 shows an embodiment of the method using two or more physical cameras according to one or more embodiments of the present disclosure.

Figure 1:
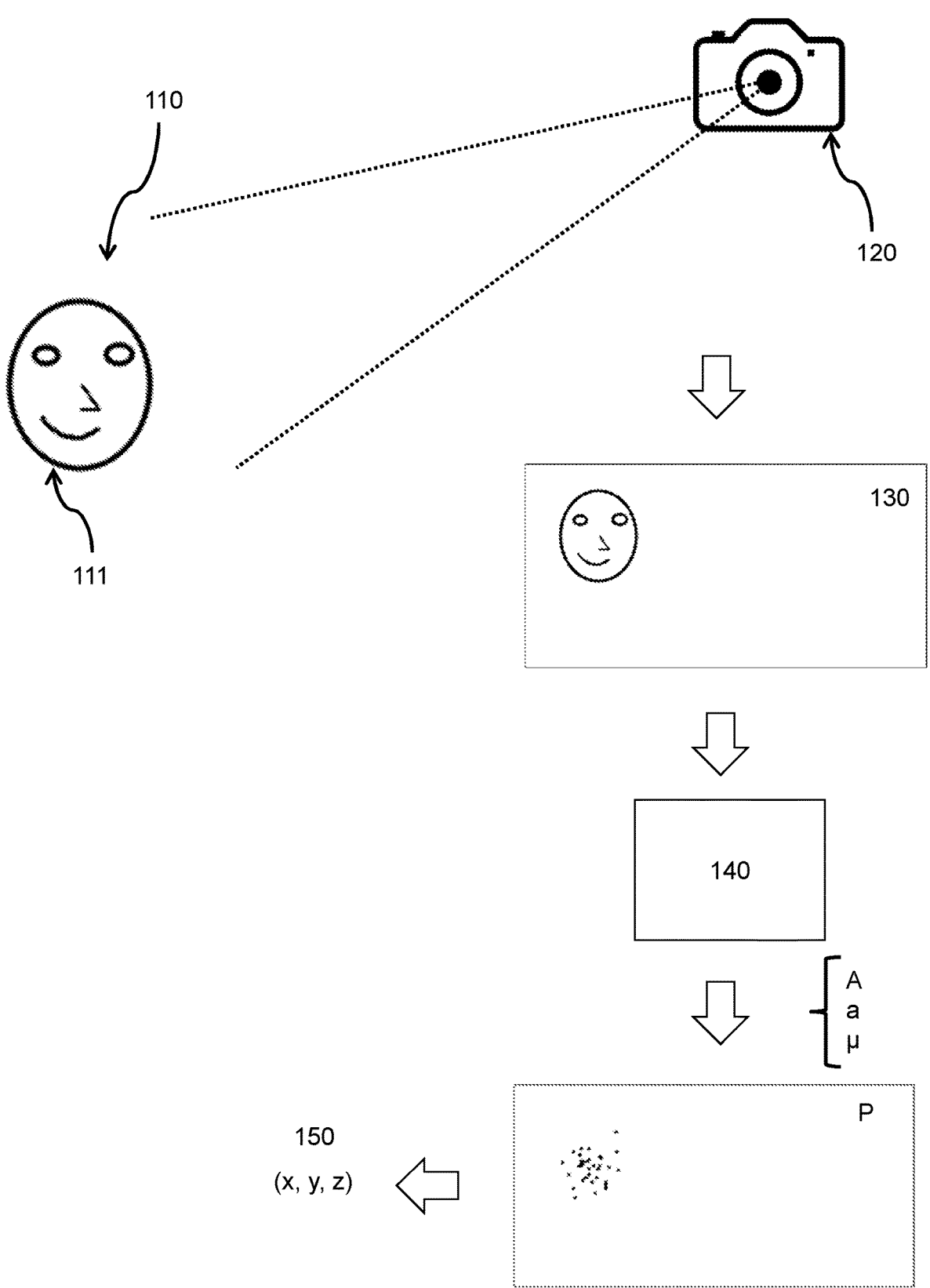
FIG. 1 illustrates a method of estimation of three-dimensional positions of target objects according to one or more embodiments of the present disclosure.

A more complete understanding of embodiments of the invention will be afforded to those skilled in the art, as well as a realization of additional advantages thereof, by consideration of the following detailed description of one or more embodiments. It should be appreciated that like reference numerals are used to identify like elements illustrated in one or more of the figures.

DETAILED DESCRIPTION

An "or" in this description and the corresponding claims is to be understood as a mathematical OR which covers "and" and "or" and is not to be understand as an XOR (exclusive OR). The indefinite article "a" in this disclosure and claims is not limited to "one" and can also be understood as "one or more", i.e., plural.

This application refers to documents Linden 2019, Mohlin 2021, Liu 2018, Robbins 1951 and Kingma 2014 which are hereby included in full and by reference.

LINDÉN, Erik; SJOSTRAND, Jonas; PROUTIERE, Alexandre. Learning to personalize in appearance-based gaze tracking. In: Proceedings of the IEEE/CVF International Conference on Computer Vision Workshops. 2019. p. 0-0.

MOHLIN, David; BIANCHI, Gerald; SULLIVAN, Josephine. Probabilistic Regression with Huber Distributions. arXiv preprint arXiv:2111.10296, 2021.

LIU, Katherine, et al. Deep inference for covariance estimation: Learning gaussian noise models for state estimation. In: 2018 IEEE International Conference on Robotics and Automation (ICRA). IEEE, 2018. p. 1436-1443.

ROBBINS, Herbert; MONRO, Sutton. A stochastic approximation method. *The annals of mathematical statistics,* 1951, 400-407.

KINGMA, Diederik P.; BA, Jimmy. Adam: A method for stochastic optimization. *arXiv preprint arXiv:*1412.6980, 2014.

This invention relates to estimation of three-dimensional positions, e.g., positions of target objects in an image. The main concept involves capturing an image of a real-world scene by a physical camera having a particular field of view.

The captured image is then provided to a suitable object detector that returns coordinates of a sought-after object/ target object and/or a patch of pixels representing the object in the captured image and/or a bounding box enclosing the target object.

A virtual camera is created, e.g., based on the detected object coordinates and predetermined calibration parameters to create a virtual camera. Creating a virtual camera is further described in relation to FIG. 2. The predetermined calibration parameters may comprise e.g., camera intrinsic and camera extrinsic. The calibration parameters are selected such that the entire detected object (in the captured image) is represented in a subset of pixels in the captured image. In a sense, the calibration parameters are selected such that the virtual camera "zooms in" on the detected object in the captured image. In other words, a virtual camera that "zooms in" on the detected object and related coordinates is created.

In one example, the camera is configured with a fixed image resolution, a principal axis which intersects the estimated center of the detected object, e.g., based on the coordinates of a sought-after object/target object and/or the patch of pixels representing the object in the captured image and/or the bounding box enclosing the object. It is understood that the principal axis of a virtual camera intersects with the position of the physical camera and the detected object. A focal length is selected for the virtual camera to be as small as possible, with the condition that the whole object is captured using the selected focal length.

The resulting virtual camera is configured with a principal axis that intersects the position of the physical camera and a target object. It is then possible to find a correspondence or projection between the coordinates in the original camera's image space and the virtual camera's image space. The pixel values for the virtual camera can be sampled from the captured image by standard image interpolation methods, such as nearest neighbour, bilinear or bi-cubic, to create an image which is indistinguishable from an image captured by a camera with the calibration parameters of the virtual camera, except for some interpolation artifacts.

The image from the virtual camera is then used as input to a trained model, e.g., a convolutional neural network, which predicts parameters of a probability distribution of the position of the target object relative to the location and orientation of the virtual camera. The output of the trained model is then optionally sent through a function N which maps/transforms the parameters to a standard form and enforces the constraints of the parameters of the distribution.

The mapped parameters and probability distribution can then be mapped back to a coordinate system of the original physical camera/s, using the previously determined correspondence or projection between the coordinates in the original camera's image space and the "virtual camera's" image space.

The trained model is initially trained using training data comprising images captured by the physical camera and corresponding known coordinates in the captured image for a target object. The trained model, or the parameters of the trained model, is fitted to output estimates of the probability distribution and resulting estimated three-dimensional position of at least one target object, which are consistent with the training data, by iteratively optimizing a fitness function, also known as loss or loss function, to the training data. A standard way to design such a loss or loss function is to use a negative log likelihood function for the probability distribution in question.

At least one purpose of the present disclosure is to improve accuracy of the generated probability distribution and thereby the accuracy of the estimated three-dimensional position/coordinate of at least one target object.

Definitions

In the present disclosure the term "calibration parameters" denotes parameters of a mapping from the captured image space to a real-world scene space. Calibration parameters typically comprise camera intrinsic and/or camera extrinsic. The extrinsic of a camera describes the position and orientation of the camera in 3D space. The intrinsic of the camera describes other properties of the camera, such as a principal axis, a field of view and a focal length.

In the present disclosure, the term "position" or "position of at least one target object" is used interchangeably.

The term "scene" used herein denotes an observed part or section of the real-world or a simulated world.

The term "physical camera" used herein denotes an imaging device, such as a video camera or a still camera, and comprises at least an optical system, lenses etc., and/or an image sensor with an array of image pixel sensors. The imaging device is configured to capture digital images of a real-world scene.

The term "video" or "image" used herein denotes an electronic medium for the recording, copying, playback, broadcasting, and display of moving or static visual media. The video comprises one or a plurality of subsequent video frames. Each video frame comprises a representation of a field of view of a scene. The representation comprises a plurality of pixels arranged to a particular aspect ratio, and a particular resolution.

FIG. 1 illustrates a method of estimation of three-dimensional position/s of at least one target object according to one or more embodiments of the present disclosure.

In FIG. 1 a real-world scene 110 is shown. The scene 110 comprises at least one (target) object 111, e.g., a human face in front of a screen. The scene 110 is captured as an image 130 by the physical camera 120. The physical camera 120 may be a video camera or a still camera and includes at least an optical system, lenses etc., or an image sensor with an array of image pixel sensors.

A parameter estimator 140 estimates parameters $(A, a, \mu)$ of a probability distribution P indicative of a likelihood that the at least one target object 111 is in or is located in a particular position 150 $(x, y, z)$ in the scene captured in the image 130. In FIG. 1, the probability distribution P is illustrated with increasing density of dots corresponding to increased likelihood that the at least one target object 111 is in a particular position 150 $(x, y, z)$ in the scene captured by the camera 120 in the image 130. The probability distribution P is in FIG. 1 illustrated in the two dimensions of the captured image 130 (horizontal axis x, vertical axis y); however, it is understood that the probability distribution P indicates a likelihood of at least one target object. In one example, three degrees of freedom probability distribution P may relate to the estimated three-dimensional position and four degrees of freedom relate to uncertainty of the estimation.

Figure 10:
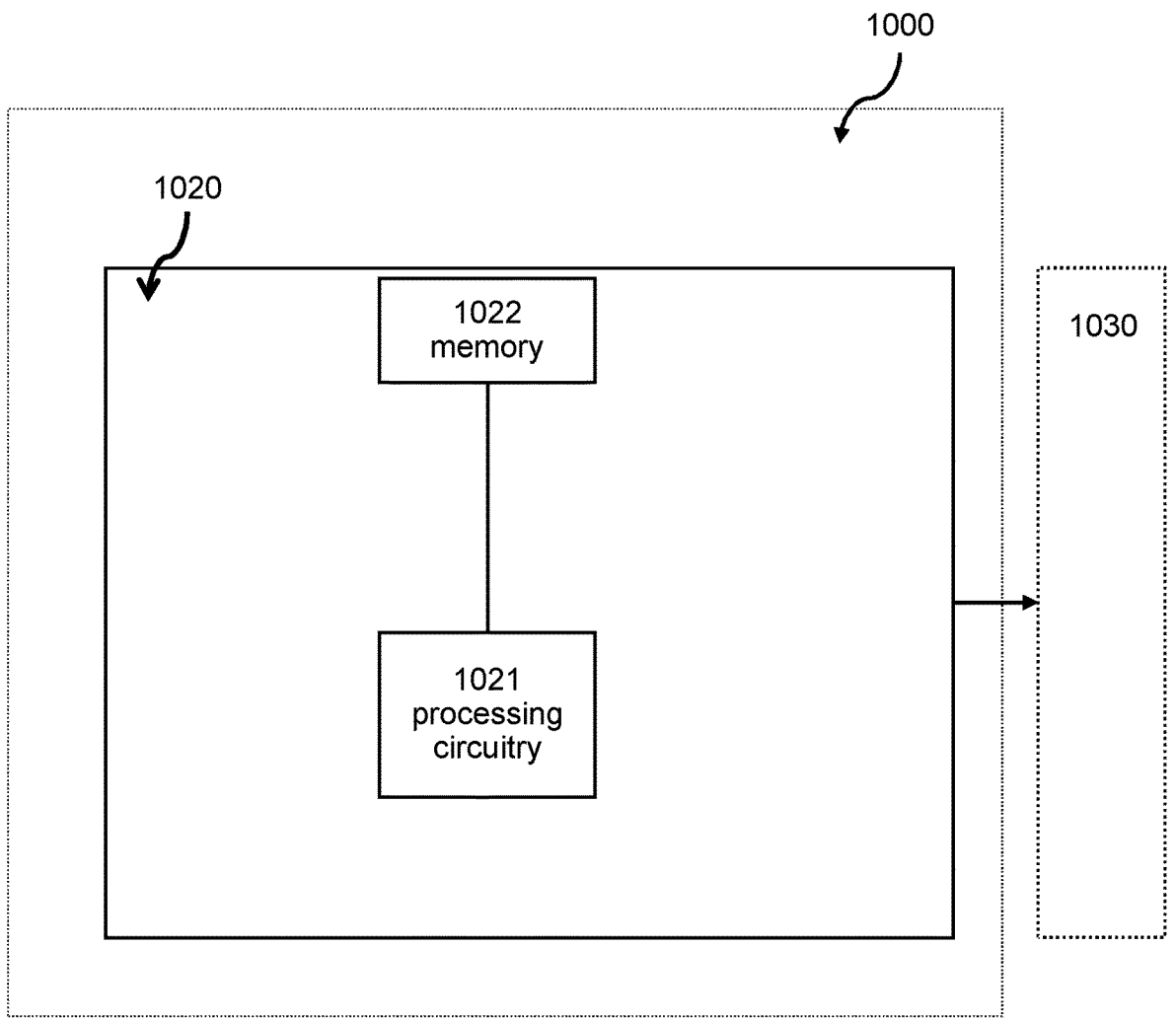
FIG. 10 shows a system according to one or more embodiments of the present disclosure.

A three-dimensional position 150 of at least one target object 111 is then estimated using the probability distribution P. The estimation may e.g., be performed by a processor/processing circuitry as illustrated in FIG. 10.

Figure 2:
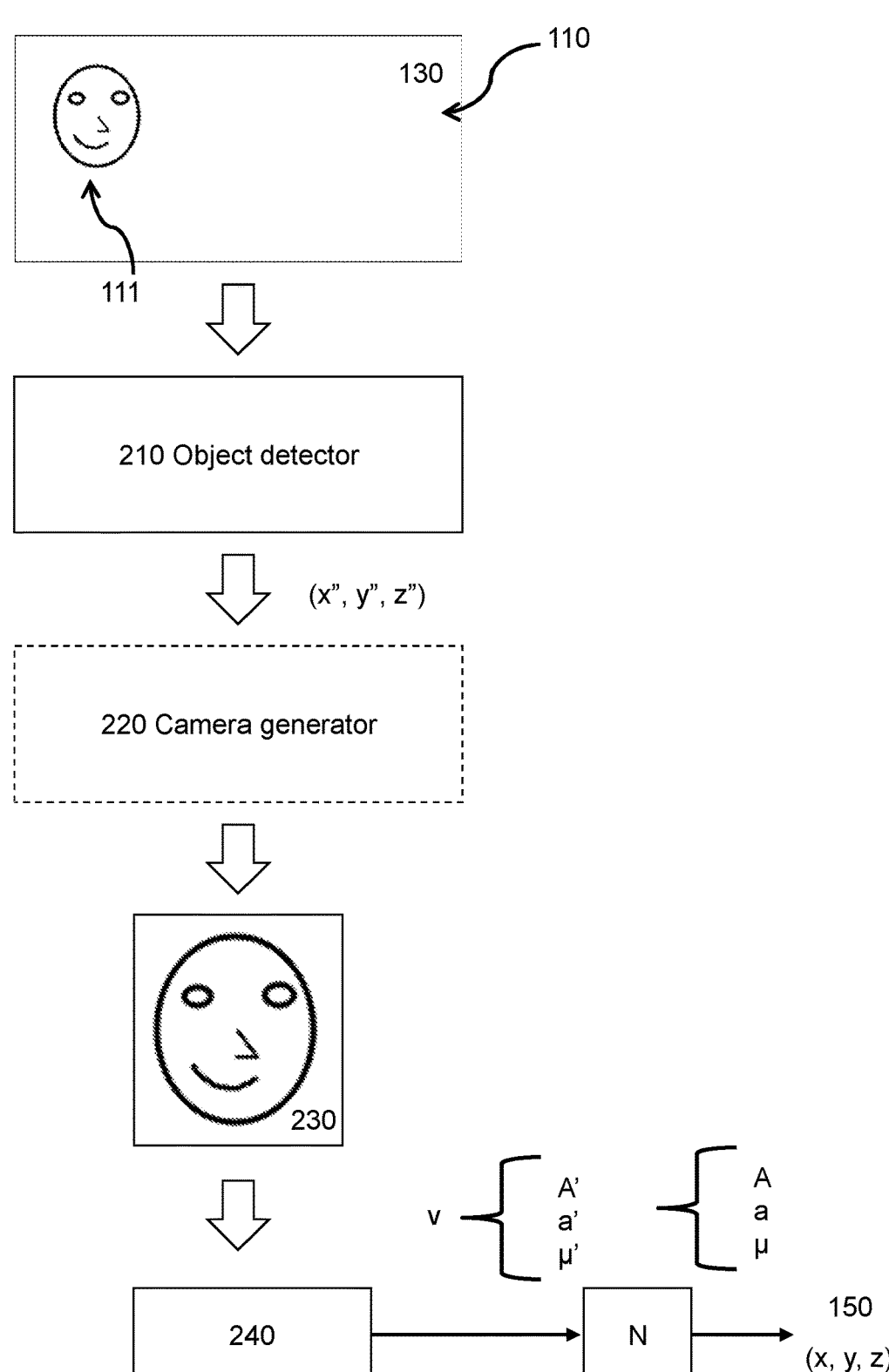
FIG. 2 illustrates further details of the method for estimation of three-dimensional positions of target objects according to one or more embodiments of the present disclosure.

FIG. 2 illustrates further details of the method for estimation of three-dimensional positions of at least one target object according to one or more embodiments of the present disclosure.

In a first step, a first image 130 is obtained that depicts the scene 110, shown in FIG. 1.

The first image 130 is typically obtained by capturing the image 130 by the physical camera 120, shown in FIG. 1. As shown in FIG. 2, the scene 110 and the captured image depicting the scene 130 comprise at least one target object 111.

In a subsequent step, at least one object is detected wherein at least one target object 111 is detected using an object detector 210 and the first image 130.

Detecting comprises, in embodiments, identifying, by the object detector 210, the at least one target object 111 and generating, by the object detector 210, coordinates 150 (x", y", z") indicating a position in the first image of the at least one detected target object 111. The coordinates may, e.g., be defined as coordinates and size of the target object, as a patch of pixels representing the target object in the captured image and/or as a bounding box enclosing the object.

The object detector 210 may be any suitable object detector, such as any of Viola-Jones object detection framework based on Haar features, Scale-invariant feature transform (SIFT), Histogram of oriented gradients (HOG) features, Region Proposals (R-CNN), Fast R-CNN, Faster R-CNN, cascade R-CNN. Single Shot MultiBox Detector (SSD), You Only Look Once (YOLO), Single-Shot Refinement Neural Network for Object Detection (RefineDet), Retina-Net, Deformable convolutional networks.

Figure 6:
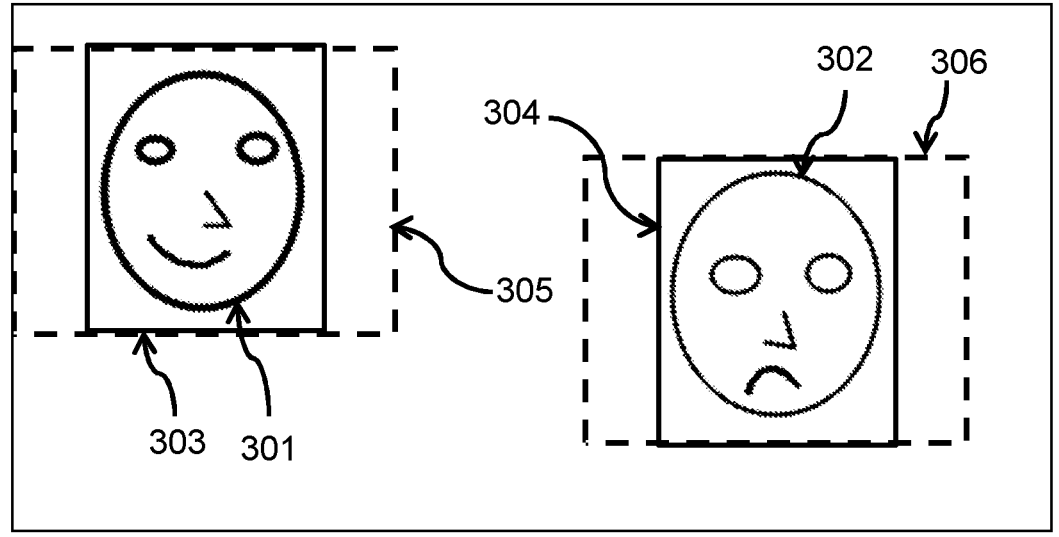
FIG. 6 illustrates an example of generating the set of images according to one or more embodiments of the present disclosure.

Optionally, the method further comprises generating 220 a virtual camera configured with a principal axis that intersects a position of the physical camera and the detected object. Additionally, or alternatively, the method further comprises generating one or more target areas 305, 306, as shown in FIG. 6, using predetermined camera calibration parameters for the physical camera, wherein each one target areas 305, 306 defines a respective subset of the scene being depicted by a respective virtual camera, wherein the respective subset comprises a respective detected target object 111. It is to be understood that the target area may be defined by a set of generated coordinates. In one example, the generated coordinates would be corners of a bounding box around the target objects. In another example, the generated coordinates may have other forms to ensure enclosing the target object with a geometrical shape. Such coordinates may for example be generated based on the object detector. The object detector may be a face detector. The target area with a predetermined aspect ratio is illustrated as the frame outlining a set of images 230.

In a subsequent step, the set of images 230 is generated that depict subsets of the captured scene 110. The subsets of the scene 110 being depicted by at least one virtual camera. In other words, the virtual camera extracts pixels from the image captured by the physical camera, e.g., by selection of pixels/pixel values or by interpolation of pixels/pixel values.

The detected coordinates are optionally used to create a virtual camera with predetermined calibration parameters. The virtual camera is generated such that the entire detected target object 111 in the captured image 130 is represented in a subset of pixels derived from the captured image 130. In a sense, the virtual camera is generated, and calibration parameters are selected such that the virtual camera "zooms in" on the detected object in the captured image. In other words, the calibration parameters are selected to ensure that the field of view of the virtual camera includes the entire detected object 111.

In one example, this includes generating 220 a virtual camera configured with a principal axis that intersects a position of the physical camera and the detected object. The focal length of the virtual camera is then selected such that the field of view of the virtual camera is fully enclosing the detected object. In FIG. 2 this is illustrated by "zooming" in on the face in the scene 110, shown in FIG. 1, and generating a subset of the first image 230.

The pixel values for the "virtual camera" can be sampled from the image captured by the physical camera by standard image interpolation methods, such as nearest neighbor, bilinear or bi-cubic, to create an image which is indistinguishable from an image captured by a camera with the calibration parameters of the virtual camera, except possibly some interpolation artifacts.

In a subsequent step, parameters of a probability distribution P indicative of a likelihood that the at least one target object 111 is in a particular position 150 (x, y, z) in the scene are estimated by providing the generated set of images 230 to a trained model, e.g., a Convolutional Neural Network, depicted as 240 in FIG. 2.

In an intermediate step, an intermediate output of the trained model, illustrated by a vector v (A', a', μ') in FIG. 2, is transformed, by applying a transformation function N to the estimated parameters/vector v, to transform the estimated parameters (A', a', μ') within predetermined constraints of the probability distribution P to transformed and constrained parameters (A, a, μ). In other words, the transformation function N forces the intermediate output parameter of the trained model (A', a', μ') to output parameters fulfilling the constraint (A, a, μ). Such constraints are boundary conditions, such as positive definiteness for A, $\mu_z > 0$ and the constraint that parameter a is large enough to guarantee convexity of the negative log likelihood.

The probability distribution P with a density function f can then be derived using the parameters fulfilling the constraint (A, a, μ).

In a subsequent step, the three-dimensional position (x, y, z) 150 of the at least one target object 111 is estimated using the probability distribution P based on the transformed and constrained parameters (A, a, μ).

At least one advantage of this embodiment is that accuracy when estimating a distance to the target object and estimating the direction/ray to the target object from images is increased and computational complexity is simultaneously reduced.

The disclosed method may further be illustrated in a flowchart.

FIG. 3 shows a flowchart of a method 300 according to one or more embodiments of the present disclosure. The method 300 estimates a three-dimensional position 150 of at least one target object 111 and is performed by a computer. The method comprises:

Step 310: obtaining a first image 130 depicting a scene 110, wherein the scene 110 comprises at least one target object 111. The first image may be captured by a physical camera 120 or generated by other suitable image sources with known calibration parameters.

The calibration parameters of the physical camera are known, and therefore the relation between a point on the image space/plane and a ray in the real-world space from the image sensor of the camera to objects in the real-world scene.

Step 320: detecting at least one target object 111, wherein at least one target object 111 is detected using an object detector 210 on the first image 130. Additionally, or alternatively, detecting comprises identifying 321, by the object detector 210, the at least one target object 111 and generating 323, by the object detector 210, coordinates indicating a position of the at least one detected target object. The object detector further described in relation to FIG. 2.

The object detector typically returns coordinates of a sought-after object/target object and/or a patch of pixels representing the target object in the captured image and/or a bounding box enclosing the object. Coordinates indicating the position of at least one detected target object may be derived as the returned coordinates, as any of the pixel coordinates of the patch (in the respective image) or as center or corner coordinates of the bounding box. In other words, the returned coordinates from the detector may e.g., be defined as coordinates and size of the target object, as a patch of pixels representing the target object in the captured image and/or as the bounding box enclosing the object.

Step 330: generating a set of images 230 depicting subsets of the captured scene 110. The subsets of the scene are depicted by at least one virtual camera.

In one example, a single target object is detected, e.g., an eye or nose tip in a human face. A virtual camera is generated that is configured with a principal axis that intersects with the physical camera and the center of the eye or nose tip. The focal length of the virtual camera is then selected such that the field of view of the virtual camera fully encloses the detected object, such as the human eye. This may, for example, involve adapting the field of view of the virtual camera to a bounding box generated by the object detector 210. Generating the set of images 230 by the virtual camera is further described in relation to FIG. 2.

In one further example, two target objects are detected, e.g., two eyes in a human face. Two virtual cameras are then generated. A first virtual camera is generated that is configured with a principal axis that intersects with the physical camera and the center of the pupil of the left eye. A second virtual camera is generated with a principal axis that intersects with the physical camera and the center of the pupil of the right eye. The focal length of the first virtual camera is then selected such that the field of view of the virtual camera fully encloses the left eye. The focal length of the second virtual camera is then selected such that the field of view of the second virtual camera fully encloses the right eye. This may, for example, involve adapting the field of view of the virtual cameras to bounding boxes generated by the object detector 210. Generating the set of images 230 then comprises generating the images depicted by the first virtual camera of the first eye and depicted by the second virtual camera of the second eye respectively.

Figure 5A:
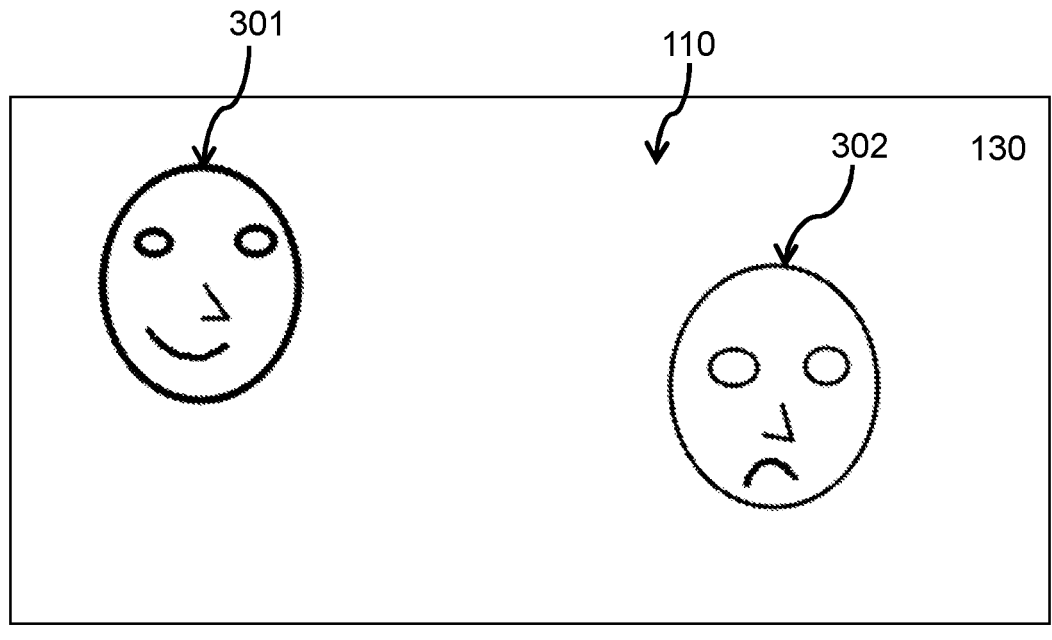
FIG. 5A illustrates an example of obtaining a first image comprising two target objects according to one or more embodiments of the present disclosure.
Figure 5B:
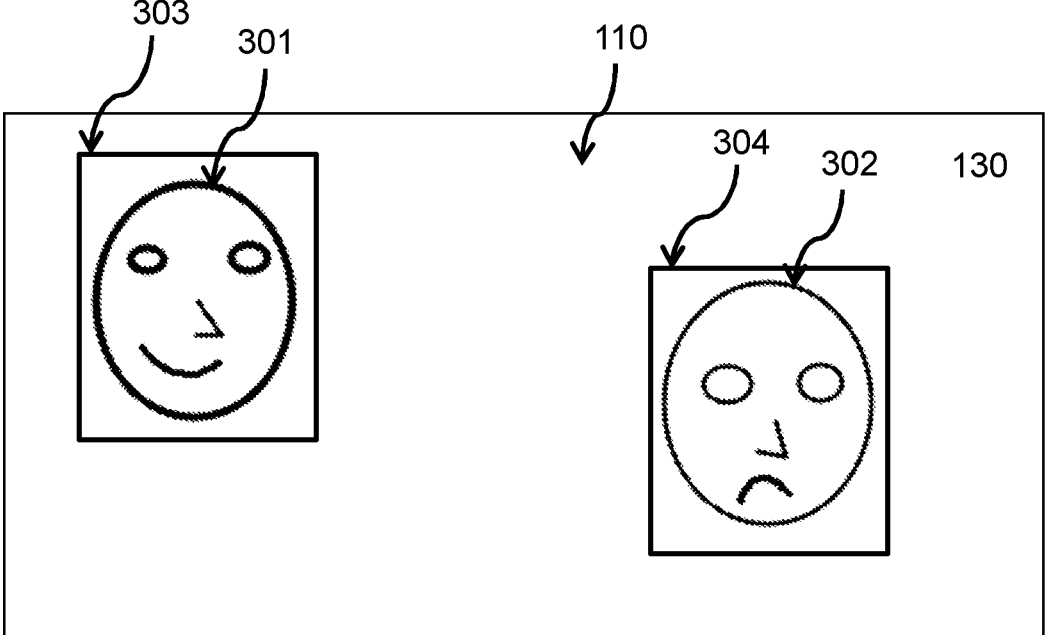
FIG. 5B illustrates an example of detection of two target objects according to one or more embodiments of the present disclosure.

FIG. 5B and related text illustrates one further example where two target objects are detected.

Step 340: estimating parameters of the probability distribution P indicative of a likelihood that the at least one target object 111 is in a particular position (x, y, z) 150 in the scene 110 by providing the generated set of images 230 to a trained model 240, e.g., a Convolutional Neural Network CNN.

As further described in relation to FIG. 2, the intermediate output of the trained model CNN, illustrated by a vector v (A', a', μ') in FIG. 2, is transformed, by applying a transformation function N to the estimated parameters/vector v, to transform the estimated parameters (A', a', μ') within predetermined constraints of the probability distribution P to transformed and constrained parameters (A, a, μ) or transformed and constrained output of the trained model. In other words, the transformation function N forces the intermediate output parameter of the trained model (A', a', μ') to output parameters fulfilling the constraint (A, a, μ). The probability distribution P with the density function f can then be derived using the parameters whilst fulfilling the constraint.

Figure 7A:
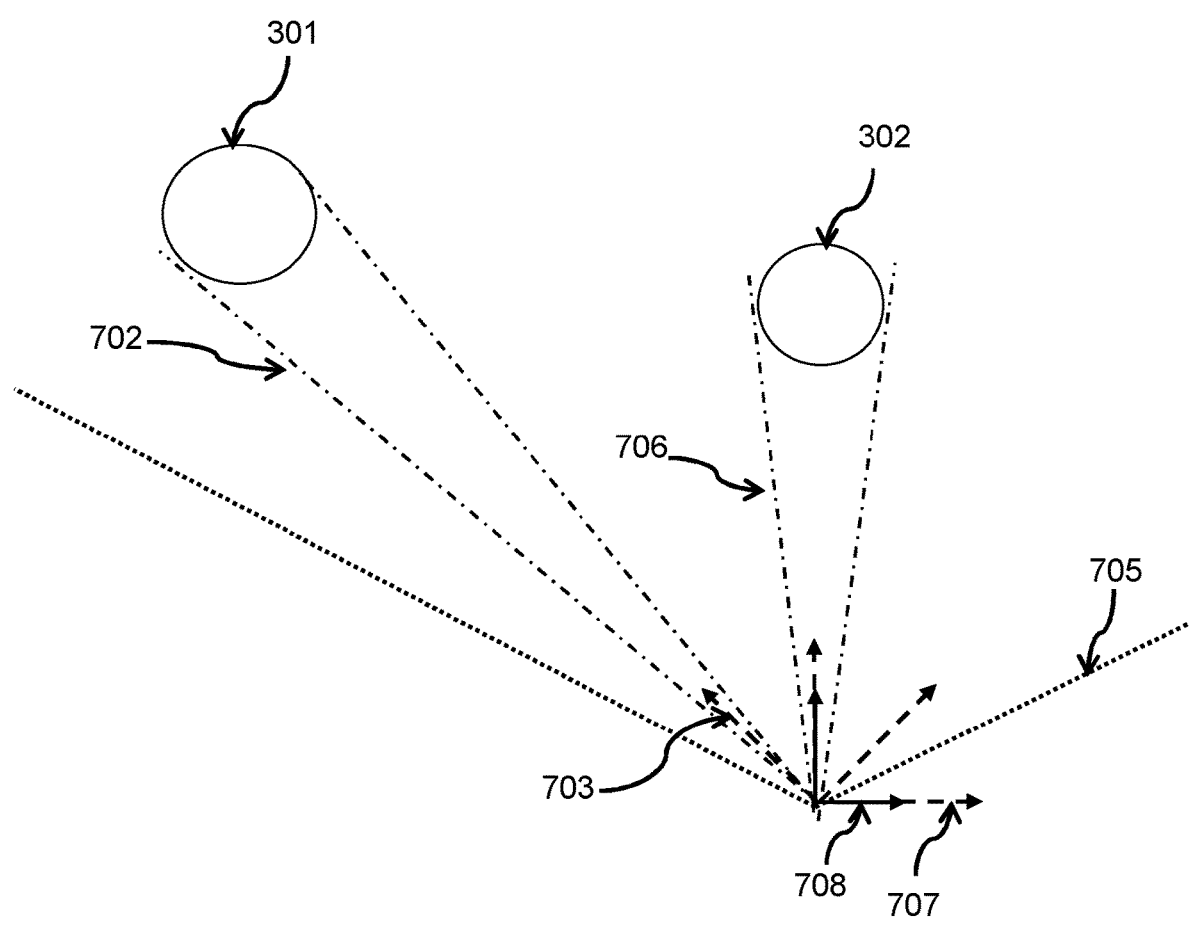
FIG. 7A illustrates further details of obtaining a first image comprising two target objects according to one or more embodiments of the present disclosure.
Figure 7B:
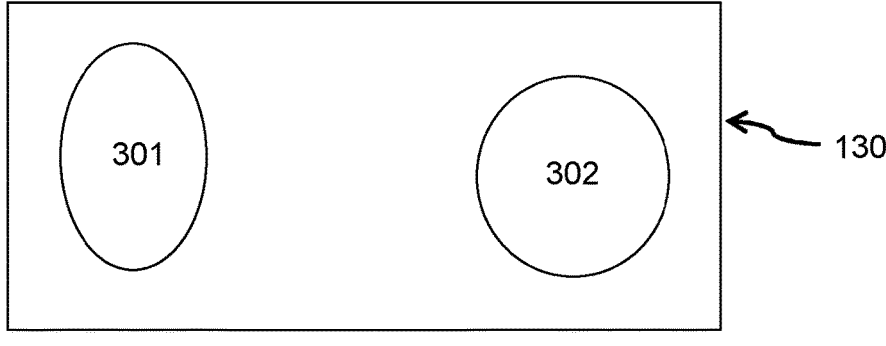
FIG. 7B illustrates an image captured by a physical camera.
Figure 7C:
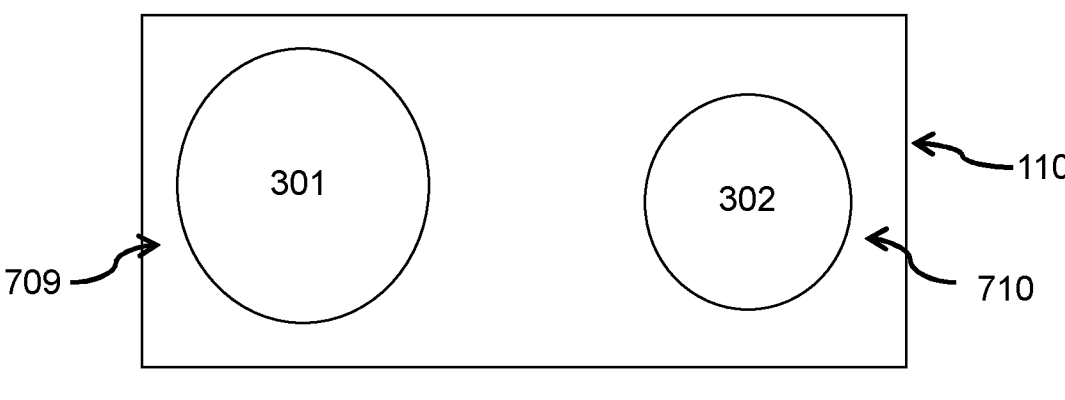
FIG. 7C illustrates a set of images depicting subsets of the captured scene.

A probability distribution for each set of images 230 is estimated or generated and is initially in a coordinate system of the respective virtual camera. See FIG. 7A-C for further details regarding coordinates systems. FIG. 7A-C illustrates that all cameras, physical and virtual cameras respectively, have a coordinate system associated with them, typically related to the principal axis and orientation of the camera/s' field of view. The coordinate systems in these examples are shown with a shared origin. However, as both the calibration parameters for the one or more virtual cameras and the calibration parameters for the physical camera/s 120 are known, the probability distribution for each of the set of images 230 can be transferred/projected to the coordinate system of the physical camera/s 120. Any suitable method in the art may be used to transform/project probability distribution for each of the set of images 230 from the coordinate system of the respective virtual camera to the coordinate system of the physical camera/s, such as rotation and/or translation The probability distribution P can for example be defined as:

$$v^* = \operatorname*{argmax}_{v} \prod_{i=1}^{|C|} p_i(R_i v + t_i)$$

V* is the most likely position, |C| is the number of cameras, i is an index iterating over all cameras $p_i$ is the estimated probability of the position using camera i $R_i$ is the orientation of camera I and $t_i$ is the position of camera i.

$R_i$v is a matrix multiplication of $R_i$ and v.

This distribution has, in one example, seven degrees of freedom. The intermediate output of the trained model, e.g., a neural network, is referred to as vector v, as described in relation to FIG. 2. The mapping between intermediate outputs from the trained model v and the probability distribution parameters of probability distribution P may, for example, be constructed as follows.

Examples of output vectors are presented in Liu 2018. In one further example in Mohlin 2021, a symmetric matrix B is formed from the output vector v using a bijection. An eigenvalue composition is then performed. Further a positive definite matrix is constructed by applying a function on each eigenvalue independently.

The parameter A can be derived from the first 3 values of vector v, by for example using the mapping described in in Liu 2018 or in Mohlin 2021. For example, in Liu 2018 they use these 3 values to parameterize an LDL decomposition of the matrix A. L is a lower unit triangular (unitriangular) matrix, and D is a diagonal matrix. The LDL decomposition is often called the square-root-free Cholesky decomposition.

The parameters $\mu_x$ and $\mu_y$ have no constraints, and can therefore be picked directly from the $4^{th}$ and $5^{th}$ value in the output vector v. The parameter $\mu_z$ has a constraint in that it needs to be positive. This constraint can be achieved by, for example, applying an exponential function on the $6^{th}$ value of the output vector v. The parameter "a" needs to be larger than:

$$a > \frac{\sqrt{5}}{4}$$

to ensure that the logarithm of the probability distribution P(x, y, z) is convex.

This constraint can be enforced by, for example, the constraint:

$$a = \min\left(|v\_7| + 1,\ e^{v\_7} + \sqrt{\frac{5}{4}}\right)$$

This probability distribution can then be mapped back to the coordinate system of the original camera since it is known via the calibration parameters how the virtual camera and the physical camera are related.

For example, if the virtual camera is rotated relative to the real camera by the rotation R, then the probability in the original camera system is $$p_{real}(v) = p_{virtual}(Rv)$$

Where R v denotes a standard matrix multiplication.

Step 350: estimating a three-dimensional position 150 of at least one target object 111 using the probability distribution P.

In one example, an evaluating function may be applied to the probability distribution P. The probability distribution P may be in the coordinate system of the physical camera 120 and the evaluating function may be a maximum function identifying the highest/largest value of the probability distribution P and associated coordinates of the first image. For example, if g(x)=|x| then the maximum likelihood point is at $$x = \mu_x \mu_z \cdot \left(\left(\frac{1}{a}\right)^{\left(\frac{1}{a}\right)}\right)$$

$$y = \mu_y \mu_z \cdot \left(\left(\frac{1}{a}\right)^{\left(\frac{1}{a}\right)}\right).$$

$$z = \mu_z \cdot \left(\left(\frac{1}{a}\right)^{\left(\frac{1}{a}\right)}\right)$$

A simpler heuristic could be $x=\mu_x\mu_z$, $y=\mu_y\mu_z$, $z=\mu_z$

Additionally, or alternatively, the method further comprises generating one or more target areas 305, 306, shown in FIG. 6, using predetermined camera calibration parameters for the physical camera, wherein each one target areas 305, 306 defines a respective subset of the scene being depicted by a respective virtual camera, wherein the respective subset comprises a respective detected target object 111. It is to be understood that the target area may be defined by a set of generated coordinates. In one example, the generated coordinates would be corners of a bounding box around the target objects. In another example, the generated coordinates may have other forms to ensure enclosing the target object with a geometrical shape. Such coordinates may for example be generated based on the object detector. The object detector may be a face detector.

In one example, generating the target area 305, 306 comprises selecting or adapting the focal length of the first virtual camera to a minimum value where the field of view (having a given aspect ratio) of the virtual camera is fully enclosing the target object 111, e.g., enclosing the target object with a geometrical shape, such as a bounding rectangle or bounding box.

Additionally, or alternatively, the one or more target areas 305, 306 are configured with a symmetric geometric shape, such as a rectangle or box defining the aspect ratio of the virtual camera, e.g., 1.85:1, 2.39:1, 4:3, 16:9 and 3:2. The x:y aspect ratio is defined as the image is x units wide and y units high.

Additionally, or alternatively, the predetermined camera calibration parameters for the at least one virtual camera comprises a selection of image sensor size, a principal axis intersecting with the virtual camera/s and the at least one target object and a focal length. The generated set of images are generated by applying the predetermined camera calibration parameters for the at least one virtual camera to each virtual camera to generate the set of images and selecting pixels from the first image falling within the target area.

Additionally, or alternatively, the method 300 further comprises applying a transformation function N to the estimated parameters to transform the estimated parameters within predetermined constraints of the probability distribution P, e.g., constraints indicating that the distribution generated by the trained model integrates to a value of 1.0 and thereby is a probability distribution.

Additionally, or alternatively, the trained model is trained using training data comprising images captured by a physical camera, ground truth target areas and ground truth positions of the target object. It is understood that the term "ground truth" generally refers to data which is usually created by manual annotation. E.g., a person draws boxes and places points on the images in question. Ground truth data may further be created through other means, but the standard is manual annotation.

In one example, the training data comprises a plurality of images captured by a physical camera. The training data may further comprise known/ground truth coordinates of a sought-after object/target object in each of the plurality of images. The training data may further comprise known/ground truth patches of pixels representing the objects in each of the plurality of images. The training data may further comprise a known/ground truth bounding box enclosing the target object.

The parameters of the trained model, e.g., weights of neurons in a neural network, are trained or varied to produce trained model output that optimize a fitness function, also known as loss function, when compared to the training data.

In one embodiment, the loss function is defined to use a negative log likelihood for the distribution in question.

The loss function may then be defined as:

$$L(x, y, z, A, a, \mu) = \left\| A\left(\begin{bmatrix} x/z \\ y/z \end{bmatrix} - \begin{bmatrix} \mu_x \\ \mu_y \end{bmatrix}\right) \right\|_2 * \frac{z}{\mu_z} + \log\left(\frac{z}{\mu_z}\right) + \exp\left(a * g\left(\log\left(\frac{z}{\mu_z}\right)\right)\right) - \log(N(A, a, \mu))$$

Where N is a function with respect to the parameters of the distribution (A, a, μ) that force the distribution based on vector v to integrate to 1.0. I.e., to ensure that P is a probability distribution.

Backpropagating this loss or loss function through the trained model e.g., a convolutional neural network, CNN, gives the gradient with respect to the network weights.

Applying a gradient-based optimization method such as SGD (Robbins 1951) or Adam (Kingma 2014) to update the trained model parameters. For example, the optimization performed in SGD is $$w_{t+1} = w_t + \nabla_w L(w_t)$$

where ∇ means computing the standard gradient of L.

Additionally, or alternatively, the trained model is trained using a gradient-based optimizer and a loss function between the coordinates of target objects and the ground truth coordinates of target objects.

Additionally, or alternatively, the loss function comprises a negative log likelihood function.

Additionally, or alternatively, the loss function is defined as:

$$L(x, y, z, A, a, \mu) = \left\| A\left(\begin{bmatrix} x/z \\ y/z \end{bmatrix} - \begin{bmatrix} \mu_x \\ \mu_y \end{bmatrix}\right) \right\|_2 * \frac{z}{\mu_z} + \log\left(\frac{z}{\mu_z}\right) + \exp\left(a * g\left(\log\left(\frac{z}{\mu_z}\right)\right)\right) - \log(N(A, a, \mu))$$

where (x, y, z) are coordinates of the target object, (A, a, μ) are the parameters of the probability distribution, N is a normalizing constant forcing the output parameters of the trained model (A', a', μ') to output parameters fulfilling the constraint (A, a, μ), f(x) is a function, which is defined later, $\mu_x$ is the average value of x/z for the estimated probability distribution, $\mu_y$ is the average value of y-z for the estimated probability distribution, $\mu_z$ is Proportional to the average depth of the estimated object, g(x) is a function, which we define later.

Additionally, or alternatively, the probability distribution P is defined as:

$$P(x, y, z) = N(A, a, \mu) \exp\left(-f\left(\left\| A\left(\begin{bmatrix} x/z \\ y/z \end{bmatrix} - \begin{bmatrix} \mu_x \\ \mu_y \end{bmatrix}\right) \right\| \frac{z}{\mu_z}\right)\right) \frac{\mu_z}{z} \exp\left(a * g\left(\log\left(\frac{z}{\mu_z}\right)\right)\right)$$

where P is the likelihood that the target object is in a particular position (x, y, z) in the scene, A is a 2×2 covariance matrix defining the image plane of the physical camera, a is standard deviation of the estimated depth of the target object, μ is an average value of the estimated depth of the target object, ‖ ‖ is a norm and [ ] is a two-dimensional vector, and where the function g(z) is configured to be symmetric around 0, and where the expression $$\exp\left(a \cdot g\left(\log\left(\frac{z}{\mu_z}\right)\right)\right) + \log\left(\frac{z}{\mu_z}\right)$$

is convex relative to a z axis of a coordinate system of at least one of the virtual cameras which the estimate is associated with.

The function f of the probability distribution P may in different embodiments of the invention be selected from any of the functions:

$$f(x) = \frac{\exp(-x^2)}{2},$$

$$f(x) = \exp(-|x|).$$

$$f(x) = \exp(-h_1(x)).$$

The function g of the probability distribution P may in different embodiments of the invention be selected from any of the functions:

$$g(x)=|x|,$$

$$g(x)=x^2,$$

$$g(x)=h_1(x).$$

Additionally, or alternatively, the method further comprises transforming the estimated three-dimensional position of at least one target object to a position in a coordinate system of the first image. In other words, transform a three-dimensional position of at least one target object in a coordinate system of the virtual camera to a three-dimensional position in a coordinate system of the first image/physical camera.

In one example, the coordinate system of the virtual camera and real camera share their origin. I.e., their respective principal axis intersects at a point in the physical camera. However, the physical camera and the virtual camera have different orientations/principal axes. The transform between these coordinate systems is then effectively a rotation.

In one example, a single target object is detected, e.g., an eye in a human face. A virtual camera is generated that is configured with a principal axis that intersects the position of the physical camera and the center of the pupil rather than the center of the first image. The focal length of the virtual camera is then selected such that the field of view of the virtual camera fully encloses the detected object, such as the human eye. This may, for example, involve adapting the field of view of the virtual camera to a bounding box generated by the object detector 210. Generating the set of images 230 by the virtual camera is further described in relation to FIG. 2. The generated set of images 230 are then fed to the trained model, which returns parameters of the probability distribution P with associated coordinates of the virtual camera. A three-dimensional position of at least one target object 111 is then estimated using the probability distribution P. The estimated position of at least one target object is then defined in the coordinate system of the virtual camera. The estimated three-dimensional position is then transformed to an estimated position in a coordinate system of the first image.

To further improve accuracy of the estimated three-dimensional position of the target object, a second physical camera may be used.

FIG. 4 shows an embodiment of the method using two or more physical cameras according to one or more embodiments of the present disclosure.

In this embodiment, the method 300 further comprises: Step 361: obtaining a second image depicting at least a part of the scene captured by a second physical camera, wherein the at least part of the scene comprises at least one target object 111.

Step 362: detecting the at least one target object 111 wherein the at least one target object 111 is detected using the object detector and the second image, wherein detecting comprises identifying, by the object detector, the at least one target object and generating, by the object detector, second coordinates indicating a position of the at least one detected target object.

Step 363: generating a second set of images depicting subsets of the captured at least part of the scene, the subsets of the scene being depicted by at least one second virtual camera, Step 364: estimating parameters of a second probability distribution P2 indicative of a likelihood that the at least one target object is in a particular position (x, y, z) in the second image by providing the generated set of images to the trained model, Step 365: generating a combined probability distribution PC by combining the probability distribution P and the second probability distribution P2.

$$P(v) = \prod_{i=1}^{|C|} p_i(R_i v + t_i)$$

Where |C| is the number of cameras, $p_i$ is the estimated probability for each camera, $R_i$ is the orientation of camera I and $t_i$ is the position of camera i. In one example, generating a combined probability distribution PC comprises transforming both probability distributions to the same coordinate system, and then multiplying the probability distribution to form the combined probability distribution PC.

Step 366 is finding the most likely position of this distribution.

Note that in a likely implementation of the method 300, then step 365 and step 366 could be fused.

Step 366: estimating 366 the three-dimensional position of at least one target object using the combined probability distribution PC.

It is often significantly easier to estimate a direction from the camera to a target object compared to estimating a distance to the target object using images captured by the physical camera. By using multiple cameras to view the object from different angles, the combination of all estimates can have an accuracy which is orders of magnitude more accurate.

In one embodiment, the combined probability distribution P(v) can be used to estimate the three-dimensional position of the at least one target using the relation:

$$\operatorname*{argmax}_v P(v) = \arg \max_{\prod_{i=1}^{|C|} p_i(R_i v + t_i)} = \arg \min_{v \sum_{i=1}^{|C|} -log} (p_i(R_i v + t_i))$$

Where |C| is the number of cameras, i is an index iterating over all cameras, $p_i$ is the estimated probability from each camera, $R_i$ is the orientation of each camera and $t_i$ is the position of each camera. $R_i$ v is multiplying R and v using standard matrix multiplication.

Since the negative of the logarithm of the probability density function $p_i(v)$ is convex, convex functions remain convex after affine transforms with respect to the argument and addition of convex functions yield convex functions. Therefore, the most likely position given the estimates can be framed as a convex optimization problem, for this distribution. There are well known fast methods to optimize convex functions, such as line search. This makes it possible to quickly find the most likely position given the sensor estimates.

FIG. 5A illustrates an example of obtaining a first image 130 comprising two target objects 301, 302 according to one or more embodiments of the present disclosure. The first image 130 is obtained by capturing the first image by a physical camera 120 (not shown). The first image 130 depicts a scene 110, and the scene is captured by the physical camera 120. The scene 110 comprises two target objects 301, 302.

FIG. 5B illustrates an example of detection of two target objects 301, 302, according to one or more embodiments of the present disclosure. In this example, detection of objects also includes generation of a respective bounding box 303, 304, with associated coordinates, e.g., centre coordinates and/or corner coordinates defined in the coordinate system of the first image.

FIG. 6 illustrates an example of generating the set of images according to one or more embodiments of the present disclosure. In this example, as shown in FIG. 5A-B, two virtual cameras (not shown) are generated with an aspect ratio of 4:3 and the respective principal axis intersects with the principal axis of the physical camera at the image sensor of the physical camera and the respective target object 301, 302.

The focal length of the respective virtual camera is then selected such that the field of view 305, 306 of the respective virtual cameras fully enclose the detected object 301, 302, i.e., the faces in this example. In other words, the field of view 305, 306 of the respective virtual cameras forms a target area. The field of view 305, 306 is in this example illustrated with a dashed line. This may, for example, involve adapting the field of view of the virtual camera to a bounding box 303, 304 generated by the object detector 210. Generating the set of images 230 by the virtual camera is further described in relation to FIG. 2. The generated set of images 230 are then provided to the trained model 240, which returns parameters of the probability distribution P with associated coordinates of the virtual camera.

FIG. 7A illustrates further details of obtaining a first image 130 comprising two target objects 301, 302 according to one or more embodiments of the present disclosure. In this example, a bird's eye view illustrates the two target objects 301, 302, horizontal angle of view 705 of the physical camera showed by a dotted line, horizontal angles of view 702, 706, of each of the two virtual cameras, respectively, coordinate system 703, 707, of the two virtual cameras, shown by a dashed line, respectively, and a coordinate system 708 of the physical camera.

For detections of each of the target object 301, 302, a different virtual camera is constructed with a respective horizontal angle of view 702, 706. The respective virtual camera is rotated to face the target object in question and has a suitably chosen field of view to create images which mainly contain image data indicative of the respective target object 301, 302. The relative rotation can be noticed in FIG. 7A as the two coordinate systems 703, 707 are rotated with respect to each other, as seen that the coordinate system 703, is rotated counterclockwise with some angle with respect to 707. In an example, the relative rotation may be approximately 30 degrees.

FIG. 7B illustrates an image 130 captured by the physical camera (not shown). As can be seen from FIG. 7A, one object 302 is in front of the physical camera along its principal axis (shown as a vertical line with a solid line type). A second object 301 is in a direction approximately 30 degrees away from the principal axis of the physical camera. As can be seen, the angular difference will cause the second object 302 to appear warped in the image 130.

FIG. 7C illustrates the set of images 709, 710 depicting subsets of the captured scene from the virtual cameras as seen above. As can be seen, the angular difference and warping effect is now mitigated after the respective virtual camera has depicted the respective target object.

Figure 8:
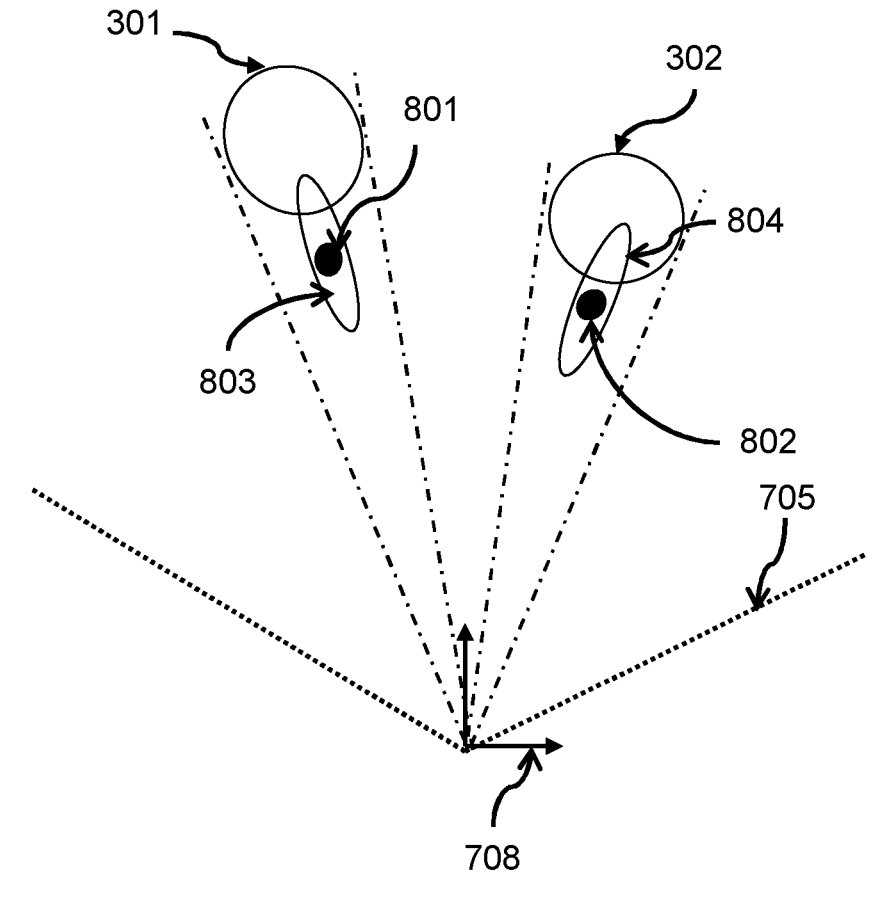
FIG. 8 illustrates an example of estimating two three-dimensional positions of respective target objects according to one or more embodiments of the present disclosure.

FIG. 8 illustrates an example of estimating two three-dimensional positions according to one or more embodiments of the present disclosure. FIG. 8 illustrates two estimated positions 801, 802 of objects 301, 302 and corresponding uncertainty illustrated by ellipses 803, 804. The uncertainties are estimated by the trained model through the output parameters A and a. This corresponds to "real" uncertainties because it is hard to fit ambiguous inputs well in the training process.

In this example, the target object may e.g., be a nose tip of a person. After estimating the probability distribution P relative to the virtual camera and then converting this distribution to the original coordinate systems of the physical cameras, it can be seen that most of the uncertainty and error is mainly due to not being able to determine the distance to the target object in an accurate manner, the nose tip in this example. The reason for this is that it is relatively easy to determine the location of the nose tip in the image captured by the camera. But estimating a distance from a virtual/physical camera to a target object is ambiguous. In one example, a face may appear smaller in the image simply because two persons' faces are of different sizes. In other words, one face may appear smaller in 3D but in fact be closer to the camera, therefore yielding visually similar appearance for the camera as two faces of equal size being located at different distances from the physical camera.

The method of the current invention provides for mitigating this problem by applying a trained model to the set of images depicting subsets of the captured scene, thereby improving accuracy of estimation of three-dimensional positions of objects.

Figure 9:
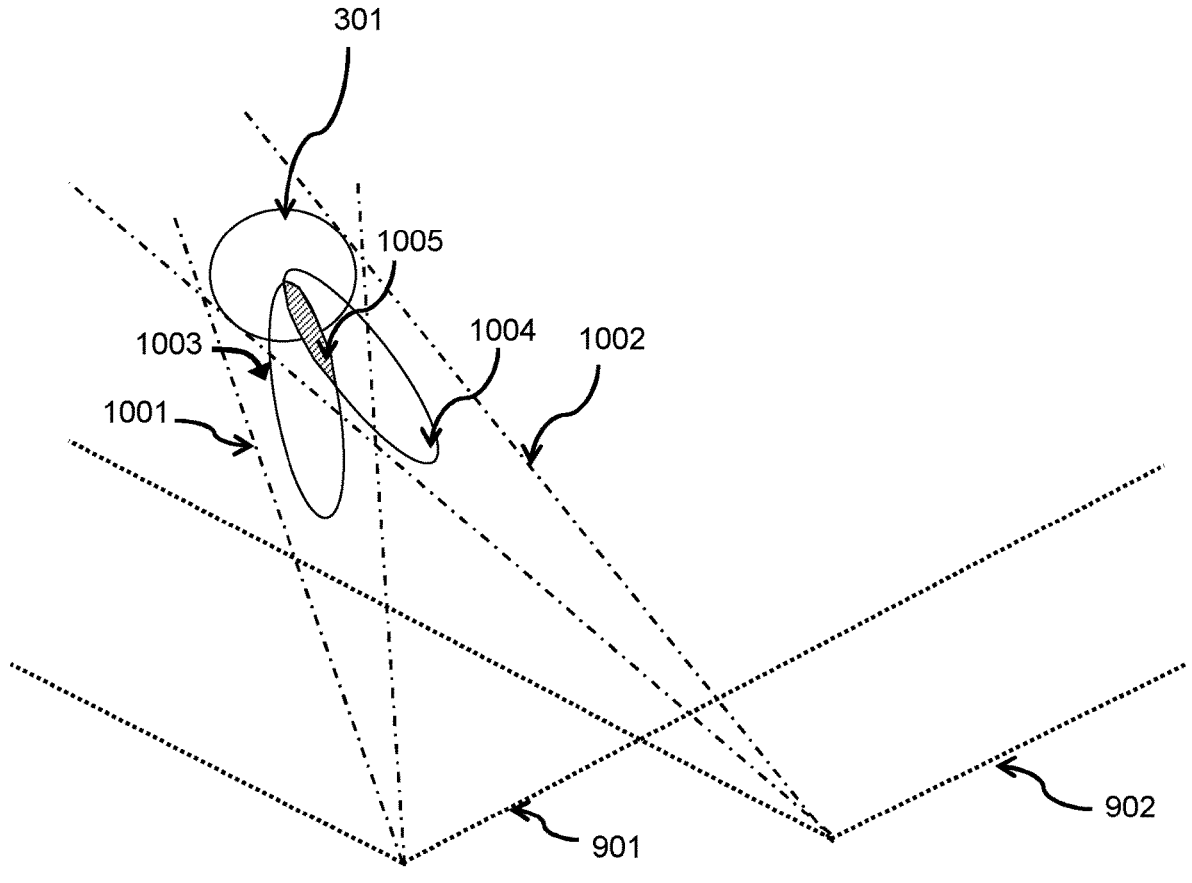
FIG. 9 illustrates an example of estimating a three-dimensional position of a target object using a combined probability distribution according to one or more embodiments of the present disclosure.

FIG. 9 illustrates an example of estimating a three-dimensional position of a target object using a combined probability distribution according to one embodiment of the present disclosure. This is further described in relation to FIG. 4.

FIG. 9 illustrates horizontal angle of view 901, 902, of two physical cameras (not shown) using dotted lines. Thus, both two physical cameras have a single target object 301 in their respective horizontal angle of view 901, 902.

FIG. 9 further illustrates horizontal angle of view 1001, 1002 of two virtual cameras illustrated by the by the dash-dotted lines. The probability distribution P of the first physical camera is shown as the ellipse 1003. The probability distribution P2 of the second virtual camera is shown as the ellipse 1004. The combined probability distribution PC is illustrated as the intersecting area 1005 of the ellipses 1003, 1004.

As can be seen from FIG. 9, the accuracy of predicting the three-dimensional position of the target object can be significantly increased by generating a combined probability distribution PC.

FIG. 10 shows a system 1000, according to one or more embodiments of the present disclosure. The system 1000 may be an eye tracking system. The system 1000 may comprise a computer 1020 configured to perform the method/s described herein. The system may optionally comprise a sensor/s (not shown). The system 1000 may further comprise an optional second computer 1030.

In one example, the sensor(s) may be configured to capture and send sensor data, e.g., gaze tracking data to the computer 1020 and/or the second computer 1030.

As mentioned previously, it is understood that the method steps described herein can be distributed between the computer 1020 and the second computer 1030 according to circumstances, without departing from the teaching of the present disclosure.

The system may optionally comprise one or more illuminators (not shown) for illuminating the eyes of a user, and at least a first camera/video camera for capturing video/images of the eyes of the user. The system may optionally further comprise a second camera/video camera (not shown), e.g., for capturing video/images of the scene 110.

The at least one illuminator and the first and second cameras/video cameras (not shown) may e.g., be arranged as separate units, or be comprised in a computer 1020.

The illuminators (not shown) may, for example, be light emitting diodes emitting light in the infrared frequency band, or in the near infrared frequency band. Each camera may, for example, be a complementary metal oxide semiconductor (CMOS) camera or a charged coupled device (CCD) camera. The camera is not limited to be an IR camera or a depth camera or a light-field camera. The shutter mechanism of the camera can either be a rolling shutter or a global shutter.

The system 1000 in FIG. 10 also comprises the computer 1020. The computer 1020 comprises processing circuitry 1021 (for example including one or more processors) for processing the images captured by the camera 1013. The circuitry 1021 may for example, be connected/communicatively coupled to the cameras 1020, 1030 and the illuminators (not shown) via a wired or a wireless connection.

The computer 1020 may be in the form of a selection of any of one or more Electronic Control Units, a server, an on-board computer, a digital information display, a stationary computing device, a laptop computer, a tablet computer, a handheld computer, a wrist-worn computer, a smart watch, a PDA, a smartphone, a smart TV, a telephone, a media player, a game console, a vehicle-mounted computer system or a navigation device.

In one example, the processing circuitry 1021 may be any of a selection of processor and/or a central processing unit and/or processor modules and/or multiple processors configured to cooperate with each-other. Further, the computer 1020, 1030 may further comprise a memory 1022.

In one example, the one or more memory 1022 may comprise a selection of a hard RAM, disk drive, a floppy disk drive, a magnetic tape drive, an optical disk drive, a CD or DVD drive (R or RW), or other removable or fixed media drive. The memory 1022 may contain instructions executable by the processing circuitry to perform any of the methods and/or method steps described herein.

In one or more embodiments the computer 1020 may further comprise an input device (not shown), configured to receive input or indications from a user and send a user-input signal indicative of the user input or indications to the processing circuitry 1021.

In one or more embodiments the computer 1020 may further comprise a display (not shown) configured to receive a display signal indicative of rendered objects, such as text or graphical user input objects, from the processing circuitry 1021 and to display the received signal as objects, such as text or graphical user input objects.

In one embodiment the display (not shown) is integrated with the user input device (not shown) and is configured to receive a display signal indicative of rendered objects, such as text or graphical user input objects, from the processing circuitry 1021 and to display the received signal as objects, such as text or graphical user input objects, and/or configured to receive input or indications from a user and send a user-input signal indicative of the user input or indications to the processing circuitry 1021.

In embodiments, the processing circuitry 1021 is communicatively coupled to the memory 1022 and/or an optional sensor interface (not shown) and/or an optional communications interface (not shown) and/or an optional input device (not shown) and/or an optional display (not shown) and/or the at least one camera (not shown). The computer 1020 may be configured to receive the sensor data directly from at least one camera (not shown) or via the wired and/or wireless communications network (not shown).

The second computer 1030, described herein may comprise all or a selection of the features described above for the computer 1020.

In one embodiment, the first computer 1020 is operative/configured to send sensor data to the second computer 1030, and the second computer 1030 is operative to perform the method described herein.

The computer may further comprise a processor 1021, and a memory 1022, said memory 1022 containing instructions executable by said processor 1021, whereby said computer is operative to perform the method described herein.

In one embodiment, a computer program is provided that comprises computer-executable instructions for causing a computer 1020, 1030, when the computer-executable instructions are executed on processing circuitry comprised in the computer, to perform the method described herein.

In one embodiment, a computer program product is provided that comprises a computer-readable storage medium, the computer-readable storage medium having previously described computer program.

The computer-readable storage medium may be a non-transitory machine-readable medium having instructions stored thereon, wherein the instructions are executable by the processing circuitry or one or more processors to perform the method described herein. The non-transitory machine-readable medium may be for example, a CD, DVD or flash memory, from which the computer program could be downloaded into the memory 1022.

Moreover, it is realized by the skilled person that the computer 1020, 1030 may comprise the necessary communication capabilities in the form of e.g., functions, means, units, elements, etc., for performing the present solution. Examples of other such means, units, elements, and functions are: processors, memory, buffers, control logic, encoders, decoders, known to a skilled person.

Especially, the processing circuitry 1021 of the present disclosure may comprise one or more instances of processor and/or processing means, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" may thus represent a processing circuitry comprising a plurality of processing circuits, such as, e.g., any, some or all of the ones mentioned above. The processing means may further perform data processing functions for inputting, outputting, and processing of data.

Finally, it should be understood that the invention is not limited to the embodiments described above, but also relates to and incorporates all embodiments within the scope of the appended independent claims.

The invention claimed is:

1. A method of estimating a three-dimensional position of at least one target object performed by a computer, the method comprising:

obtaining a first image depicting a scene captured by a physical camera, wherein the scene comprises the at least one target object, detecting at least one target object, wherein the at least one target object is detected using an object detector on the first image, wherein detecting comprises identifying, by the object detector, the at least one target object and generating, by the object detector, coordinates indicating a position of the at least one detected target object, generating a set of images depicting subsets of the captured scene, the subsets of the scene being depicted by at least one virtual camera, estimating parameters (A, a, µ) of a probability distribution (P) indicative of a likelihood that the at least one target object is in a particular position in the scene by providing the generated set of images to a trained model, wherein the probability distribution P defines a likelihood P(x, y, z) that the target object is located at a particular position (x, y, z) in the scene, and wherein the probability distribution P is defined such that its density is proportional to $$\exp\left(-f\left(\left\|A\left(\begin{bmatrix} \frac{x}{z} \\ \frac{y}{z} \end{bmatrix} - \begin{bmatrix} \mu_x \\ \mu_y \end{bmatrix}\right)\right\| \frac{z}{\mu_z}\right)\right) \frac{\mu_z}{z} \exp\left(a \cdot g\left(\log\left(\frac{z}{\mu_z}\right)\right)\right)\right)$$

where A is a 2×2 matrix, a is a scalar parameter related to depth standard deviation, and µ=(µ_x, µ_y, µ_z) is a vector representing an average position, and estimating a three-dimensional position of at least one target object using the probability distribution (P).

2. The method according to claim 1, further comprising:

generating one or more target areas using predetermined camera calibration parameters for the physical camera, wherein each one target area defines a respective subset of the scene being depicted by a respective virtual camera, wherein the respective subset comprises a respective detected target object.

3. The method according to claim 2, wherein:

the one or more target areas are configured with a symmetric geometric shape, such as a rectangle or a box.

4. The method according to claim 2, wherein:

predetermined camera calibration parameters for the at least one virtual camera comprises a selection of an image sensor size, a principal axis intersecting with the virtual camera/s and the at least one target object or a focal length, and wherein the generated set of images are generated by applying the predetermined camera calibration parameters for the at least one virtual camera to each virtual camera to generate the set of images and selecting pixels from the first image falling within the target area.

5. The method according to claim 1, further comprising:

applying a transformation function N to the estimated parameters of the probability distribution (P) to transform the estimated parameters within predetermined constraints of the probability distribution (P).

6. The method according to claim 1, wherein the trained model is trained using training data comprising images captured by the physical camera, ground truth target areas and ground truth positions of the target object.

7. The method according to claim 6, wherein:

The trained model is trained using a gradient-based optimizer and a loss function between the coordinates of target objects and the ground truth coordinates of target objects.

8. The method according to claim 7, wherein the loss function comprises a negative log likelihood function.

9. The method according to claim 8, wherein the loss function is defined as:

$$L(x, y, z, A, a, \mu) = \left\| A\left(\begin{bmatrix} x/z \\ y/z \end{bmatrix} - \begin{bmatrix} \mu_x \\ \mu_y \end{bmatrix}\right)\right\|_2 * \frac{z}{\mu_z} +$$
$$\log\left(\frac{z}{\mu_z}\right) + \exp\left(a * g\left(\log\left(\frac{z}{\mu_z}\right)\right)\right) - \log(N(A, a, \mu))$$

where (x, y, z) are coordinates of the target object, (A, a, µ) are the parameters of the probability distribution, N is a normalizing constant.

10. The method according to claim 1, wherein the probability distribution P is defined as:

$$P(x, y, z) = N(A, a, \mu)\exp\left(-f\left(\left\|A\left(\begin{bmatrix} x/z \\ y/z \end{bmatrix} - \begin{bmatrix} \mu_x \\ \mu_y \end{bmatrix}\right\| \frac{z}{\mu_z}\right)\right)\frac{\mu_z}{z}\exp\left(a * g\left(\log\left(\frac{z}{\mu_z}\right)\right)\right)\right)$$

where P is the likelihood that the target object is located in a particular position (x, y, z) in the scene, A is a 2×2 covariance matrix defining the image plane of the physical camera, a is standard deviation of the estimated depth of the target object, µ is an average value of the estimated depth of the target object, ‖ ‖ is a norm and [ ] is a two-dimensional vector, and where the function g(z) is configured to be symmetric around 0, and where the expression $g(x)=|x|$ $g(x)=x^2$ $g(x)=h_1(x).$ is convex relative to a z axis of a coordinate system of at least one virtual camera.

11. The method according to claim 10, wherein the function f of the probability distribution (P) is selected from any of the functions:

$$f(x) = \frac{\exp(-x^2)}{2},$$

$f(x) = \exp(-|x|),$ $f(x) = \exp(-h_1(x)).$

12. The method according to claim 10, wherein the function g of the probability distribution (P) is selected from any of the functions:

$g(x)=|x|,$ $g(x)=x^2,$ $g(x)=h_1(x).$

13. The method according to claim 1, further comprising transforming the estimated three-dimensional position of at least one target object to a position in a coordinate system of the first image.

14. The method according to claim 1, further comprising:

obtaining a second image depicting at least a part of the scene captured by a second physical camera, wherein the at least part of the scene comprises the at least one target object, detecting the at least one target object using the object detector and the second image, wherein detecting comprises identifying, by the object detector, the at least one target object and generating, by the object detector, second coordinates indicating a position of the at least one detected target object, generating a second set of images depicting subsets of the captured at least part of the scene, the subsets of the scene being depicted by at least one second virtual camera, estimating parameters of a second probability distribution P2 indicative of a likelihood that the at least one target object is in a particular position (x, y, z) in the second image by providing the generated set of images to the trained model, generating a combined probability distribution PC by combining the probability distribution P and the second probability distribution P2, estimating the three-dimensional position of at least one target object using the combined probability distribution PC.

15. A system comprising:

a computer comprising a processing circuitry; and a memory, said memory containing instructions executable by said processor, whereby said computer is operative to perform the method according to claim 1.

16. A computer program comprising computer-executable instructions encoded on a non-transitory computer readable medium for causing a computer, when the computer-executable instructions are executed on processing circuitry comprised in the computer, to perform the method according to claim 1.

17. A computer program product comprising a non-transitory computer-readable storage medium, the non-transitory computer-readable storage medium having the computer program according to claim 16 embodied therein.

* * * * *